United States Patent [19]

Shotey

[11] Patent Number: 4,874,906
[45] Date of Patent: * Oct. 17, 1989

[54] PLUG ENCLOSING OUTLET COVER

[76] Inventor: Michael J. Shotey, 7733 E. Cypress, Scottsdale, Ariz. 85257

[*] Notice: The portion of the term of this patent subsequent to Feb. 7, 2006 has been disclaimed.

[21] Appl. No.: 284,071

[22] Filed: Dec. 14, 1988

Related U.S. Application Data

[63] Continuation of Ser. No. 66,993, Jun. 29, 1987, Pat. No. 4,803,307.

[51] Int. Cl.4 .............................................. H02G 3/18
[52] U.S. Cl. ..................................................... 174/67
[58] Field of Search .......................... 174/67; 220/242; 439/133, 135, 136, 142, 144, 147

[56] References Cited

U.S. PATENT DOCUMENTS

| 2,510,745 | 6/1950 | Kilgore | 220/242 X |
| 4,109,095 | 8/1978 | Kling | 174/67 |
| 4,342,493 | 8/1982 | Grenell | 439/142 |
| 4,424,407 | 1/1984 | Barbic | 174/67 |
| 4,603,932 | 8/1986 | Heverly | 439/147 |
| 4,605,817 | 8/1986 | Lopez | 174/67 |

Primary Examiner—Arthur T. Grimley
Assistant Examiner—David A. Tone
Attorney, Agent, or Firm—Cahill, Sutton & Thomas

[57] ABSTRACT

A weatherproof outlet cover fits over an outdoor electric outlet and includes a mounting plate demountably secured to the outlet housing in place of a conventional face plate and a lid member demountably and pivotably mounted over the mounting plate, accommodates at least one electrical plug plugged into a receptacle in the outlet. At least one access slot is provided in the bottom of the lid member for enabling a corresponding number of electrical cords from the plugged in plugs to be extended therethrough. A first sealing member is disposed between the mounting plate and the wall surrounding the outlet housing and a second sealing member is disposed between the lid member and the mounting plate to prevent foreign matter from entering the outlet.

2 Claims, 1 Drawing Sheet

U.S. Patent  Oct. 17, 1989  4,874,906
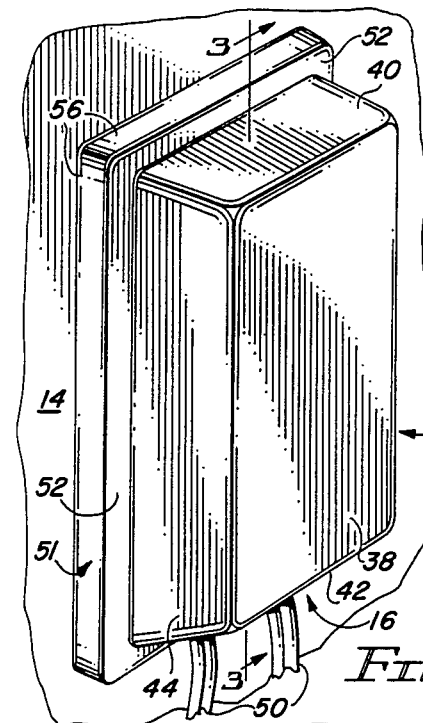
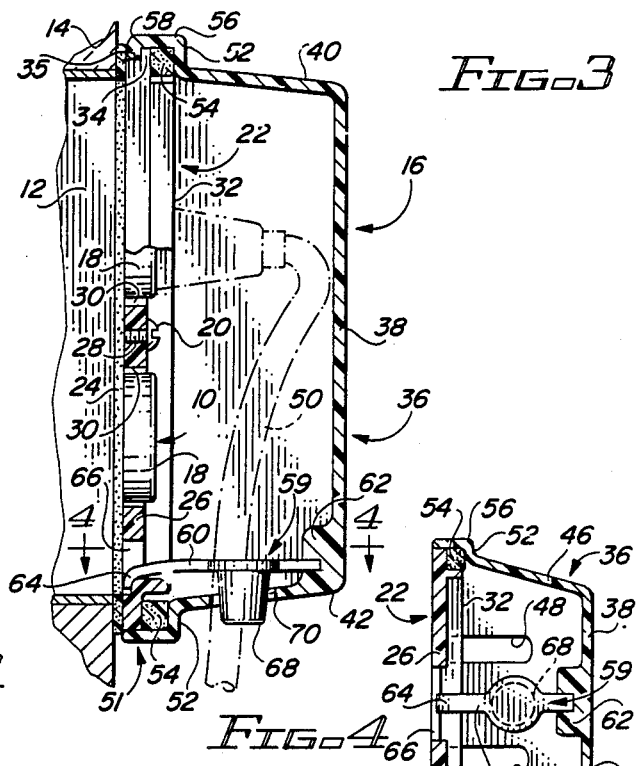
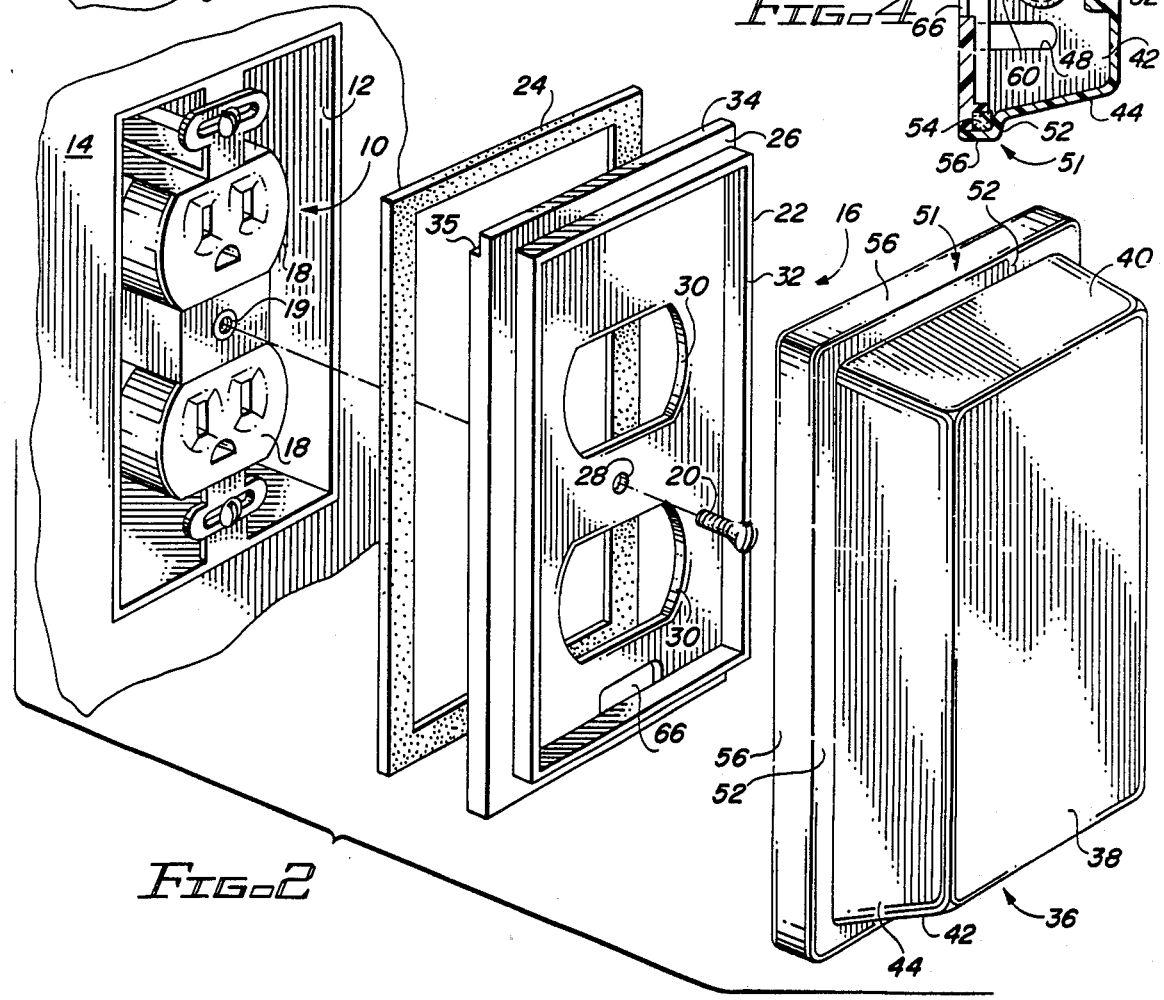

PLUG ENCLOSING OUTLET COVER

REFERENCE TO RELATED APPLICATIONS

This is a continuation application of a copending application entitled "WEATHERPROOF OUTLET COVER", Ser. No. 066,993, filed on June 29, 1987, now U.S. Pat. No. 4,803,307 describing an invention made by the present inventor.

BACKGROUND OF THE INVENTION

1. Field of the Invention

This invention relates in general to protective covers for electrical outlets and, more particularly, to a weatherproof cover for plugs in engagement with an outdoor electrical outlet.

2. Description of the Prior Art

Household electrical outlets are often situated in outdoor locations to permit plugging in various outdoor appliances, such as electric weed trimmers, sprinkler systems and outdoor lighting. These outlets are significantly more vulnerable to contamination from dirt, water and other foreign matter than outlets which are located indoors. As a result, outdoor outlets are usually provided with some type of protective cover for preventing the entry of contaminants.

The most common type of outdoor cover has a spring biased lid member which is hingedly connected to the face plate of the outlet and its is pivotable from a closed position covering and tightly sealing the plug receptacles to an open position allowing access to the receptacles. Very often, an electrical outlet includes a single face plate with a number of plug receptacles disposed therein. In such instances, a plurality of the above-described lid members are provided, with each lid corresponding to a different one of the receptacles to permit each receptacle to be covered and uncovered independently.

A major problem with such an outlet cover is that the hinged lids provide protection only while the receptacles are not in use. As soon as a lid is swung open to allow an electrical appliance to be plugged into a receptacle, that receptacle is open to the elements and vulnerable to damage from moisture and the like. Moreover, the spring arrangement required to bias the lids to a closed position is complex to manufacture and increases the cost of the product.

Various types of outlet covers are also available for mounting over indoor electrical outlets. One prior art indoor outlet cover of particular interest is a boxlike structure comprising a base frame screwably attachable to the existing receptacle face plate and an open sided cover box which slips within the frame. The cover box is locked to the base frame by protruding tabs which are received in dovetail fashion in cutouts in the frame. The sides of the box carrying the protruding tabs are flexible enough to allow the tabs to slide out of their receiving cut outs when squeezed by an adult, but rigid enough to be considered "childproof". However, because the purpose of this type of cover is to "childproof" the outlet rather than to weatherproof it, no means are provided for preventing the entry of water and dirt. Thus, such covers are unsuitable for use with outdoor outlets.

SUMMARY OF THE INVENTION

The present weatherproof cover assembly includes a mounting plate replacing conventional face plate of an electrical outlet and a lid member demountably attached to the mounting plate. Both the mounting plate and the lid member are formed of a rugged, waterproof, corrosion resistant and electrically nonconductive material. The mounting plate is generally planar and has a centrally located hole for receiving a screw fastener to secure the mounting plate to the electrical outlet. The mounting plate includes at least one cutout for exposing a corresponding number of plug receptacles of the electric outlet. The mounting plate includes a normally extending ridge disposed to surround the cutouts. The upper edge of the mounting plate is provided with an upstanding flange flush with the front face and recessed relative to the back face to provide a groove immediately behind the flange. A first sealing gasket is placed between the rear face of the mounting plate and the wall surface surrounding the electric outlet to prevent moisture, dirt and other contaminating materials from passing therebetween. The lid member is an open backed box shaped structure. Plugs with conventional electric cords mounted in the receptacles of the electrical outlet are enclosed by the lid member in a weatherproof manner. At least one slot, and preferably two, is formed through the bottom wall of the lid member to allow the cores of the installed plugs to extend from within the lid member. A peripheral flange extends normally and outwardly from the rear edges of the lid member to support a second sealing member. A lip element extends normally and rearwardly from the outermost edge of the peripheral flange to encircle the mounting plate. The lip element is provided with an inwardly turned hook portion which fits over the mounting plate flange into the groove of the mounting plate to pivotably and demountably connect the lid member with the mounting plate. A second sealing member is secured to the inner surface of the peripheral flange but not across the slot or slots. In the closed position of the lip member, the sealing strip substantially fills the gap between the raised ridge of the mounting plate and the lip element of the lid member to prevent foreign matter from passing therebetween. The lid member will not be completely sealed in the area of the access slot or slots but this does not detract from its overall weather resistance since the amount of dust, moisture and the like capable of moving upwardly from underneath the lid member would be negligible. The lid member is releasably held in a closed position over the mounting plate by a latching mechanism.

It is a primary object of this invention to provide a new and improved weatherproof outlet cover assembly for protecting an outdoor electrical outlet when the outlet receptacles are or are not in use.

Another object of the invention is to provide a weatherproof outlet cover which is inexpensive and easy to install in place of a conventional face plate.

Still another object of the invention is to provide a weatherproof outlet cover having a mounting plate installed on the wall surrounding the outlet, a lid member pivotably attached to the mounting plate, a first sealing member disposed between the mounting plate and the wall and a second sealing member disposed between the lid member and the mounting plate.

The foregoing and other objects of the present invention will be more fully understood from the following description when read in conjunction with the accompanying drawings.

BRIEF DESCRIPTION OF THE DRAWINGS

FIG. 1 is a perspective view showing the weatherproof outlet cover assembly of the present invention;

FIG. 2 is a perspective view showing the elements of the outlet cover assembly in exploded relationship to one another and to an outlet;

FIG. 3 is a sectional view taken through line 3—3 of FIG. 1; and

FIG. 4 is a sectional view taken through line 4—4 of FIG. 3.

DESCRIPTION OF THE PREFERRED EMBODIMENTS

Referring particularly to the drawings, FIGS. 1 and 3 show a conventional electrical outlet 10 contained within a housing 12 that is mounted in a suitable opening provided in a building wall 14. The various elements of outlet cover assembly 16 are shown in FIG. 2 in exploded relationship relative to the electrical outlet. As is well known in the art, outlet 10 is mounted in housing 12 and has at least one plug in receptacle 18 (two are shown). An internally threaded hole 19 is provided in the center of electric outlet 10 for receiving a fastener, such as a screw 20 which ordinarily secures a conventional face plate (not shown) to the housing. To install the weatherproof cover assembly, the conventional face plate is removed and a specially configured mounting plate 22 substituted therefore. In addition, a first sealing member, such as a gasket 24, must be installed between mounting plate 22 and wall 14 to prevent moisture, dirt and other foreign materials from passing therebetween.

Mounting plate 22 comprises a generally flat base member 26 having a hole 28 in it center for receiving fastener 20, which fastener secures it to outlet housing 12. Base member 26 is provided with at least one cut out 30 (two are shown) for exposing the corresponding number of plugs in receptacles 18 of the outlet. A raised ridge 32 is formed on the front surface of base member 26 circumscribing cut outs 30. In addition, an elongated flange member 34 extends upwardly along the upper edge of base member 26 flush with the outer face thereof and recessed relative to the back face to provide a groove 35 for pivotably supporting a lid member 36.

Lid member 36 comprises an open backed box shaped structure having front wall 38 and top 40, bottom 42 and side walls 44 and 46, which are preferably tapered as shown. At least one rearwardly opening access slot 48 (two are shown) is defined in bottom wall 42 of lid member 36 for allowing a corresponding number of electrical cords 50 to be extended therethrough. A projecting rim structure 51 extends around the perimeter of lid member 36 to closely encircle mounting plate 22 when the lid member is mounted thereon and in its closed psoition. The rim structure includes a peripheral flange 52 extending normally and outwardly from the rear edges of top 40, bottom 42 and side walls 44, 46 and defining a ledge for supporting a second sealing member 54 and a lip element 56 extending normally and rearwardly from the outer edge of peripheral flange 52. The top portion of lip element 56 includes an inwardly turned hook portion 58 which fits over elongated top flange 34 into groove 35 of mounting plate 22 to form a pivotable demountable interconnection.

Second sealing member 54 includes a strip of weatherstripping material glued or otherwise affixed to the inner surface of the ledge defined by peripheral flange 52 of lid member 36 and extending continuously along the top and side portions of lip element 56, but only partially along the bottom portion so as not to interfere with access slots 48. When lid member 36 is pivoted downwardly into its closed position, strip 54 cooperates with raised ridge 32 on the front surface of mounting plate 22 to form a tight seal to effectively prevent foreign matter from passing therebetween the lid member and the mounting plate. Lid member 36 will not be completely sealed in the area of access slots 48 but this is not expected to detract from its overall weather resistance, since the amount of dust, moisture and the like capable of moving upwardly from beneath the lid member would be negligible.

Lid member 36 is releasably held in a closed position over mounting plate 22 by means of a suitable latching mechanism. Latching mechanism 59 may be a resilient leaf spring 60 having one end fixedly secured in a reinforced portion 62 of front wall 38 of the lid member and the opposite end formed as a hood 64 receivable in an aperture 66 in the bottom of mounting plate 22. The central portion of leaf spring 60 is formed as a button 68 projecting downwardly through a hole 70 in the bottom wall of the lid member. To release the latching mechanism, it is only necessary to push upwardly on button 68 to cause hooked end 64 of the leaf spring to disengage from aperture 66 of the mounting plate. The lid member can then be lifted completely off the mounting plate, or simply pivoted upwardly about top flange 34 of the mounting plate. Electrical cables 50 can be fed through access slots 48 and plugged into or removed from the outlet receptacles.

Both the mounting plate and the lid member may be simply and inexpensively made from rugged, waterproof, corrosion resistant and electrically non conductive materials, such as heavy duty plastic using conventional molding operations or other well known processes.

While the principles of the invention have now been made clear in an illustrative embodiment, there will be immediately obvious to those skilled in the art many modifications of structure, arrangement, proportions, elements, materials and component used in the practice of the invention which are particularly adapted for specific environments and operating requirement without departing from those principles.

I claim:

1. A weatherproof cover for an outdoor electrical outlet, said cover comprising:
   (a) a waterproof, corrosion-resistant and electrically non-conductive mounting plate;
   (b) fastener means for demountably securing said mounting plate to the outlet;
   (c) said mounting plate including a lip;
   (d) a waterproof, corrosion-resistant lid member for enclosing the outdoor electrical outlet and the plug of at least one electrical cord mountable therein, said lid member being movably attached to said mounting plate and having means formed therein for allowing the electrical cord of the plugged in plug to extend from said lid member;
   (e) said lid member including a hook portion depending for engaging said lip to pivotally engage said lid member with said mounting plate;
   (f) first sealing member disposed between said mounting plate and the outlet for preventing passage of foreign elements therebetween; and (g) a second sealing member disposed between said mounting plate and said lid member for preventing passage of foreign elements therebetween.

2. A weatherproof cover for an outdoor electrical outlet, said cover comprising:
   (a) a waterproof, corrosion-resistant and electrically non-conductive mounting plate;
   (b) fastener means for demountably securing said mounting plate to the outlet;
   (c) a waterproof, corrosion-resistant lid member for enclosing the outdoor electrical outlet and the plug of at least one electrical cord plugged therein, said lid member being movably attached to said mounting plate and having means formed therein for accommodating the exteriorization of the electrical cord extending from the plug;
   (d) a first sealing member disposed between the mounting plate and the outlet for preventing passage for foreign elements therebetween;
   (e) a second sealing member disposed between said mounting plate and said lid member for preventing passage of foreign elements therebetween; and
   (f) means formed on said mounting plate for cooperating with said second sealing member to improve its sealing ability and prevent foreign elements from passing between said mounting plate and said lid member.

* * * * *